United States Patent [19]

Hill et al.

[11] Patent Number: 4,869,604
[45] Date of Patent: Sep. 26, 1989

[54] ROLLER BEARING ASSEMBLY

[75] Inventors: Gary J. Hill, Collinsville; Richard F. Murphy, Torrington, both of Conn.

[73] Assignee: The Torrington Company, Torrington, Conn.

[21] Appl. No.: 247,827

[22] Filed: Sep. 22, 1988

[51] Int. Cl.⁴ .............................................. F16C 33/58
[52] U.S. Cl. ..................................... 384/569; 384/564
[58] Field of Search .............. 384/126, 127, 424, 425, 384/452, 548, 559, 563, 564, 569, 584, 585

[56] References Cited

U.S. PATENT DOCUMENTS 4,655,618  4/1987  Labedan et al. ................. 384/564 X

FOREIGN PATENT DOCUMENTS

| 0923760 | 2/1955 | Fed. Rep. of Germany | 384/564 |
| 2558548 | 7/1985 | France | 384/569 |
| 0766170 | 1/1957 | United Kingdom | 384/564 |

Primary Examiner—Thomas R. Hannon
Attorney, Agent, or Firm—Frank S. Troidl

[57] ABSTRACT

The bearing assembly when pressed on a shaft will be axially located in either direction. The assembly consists of a roller bearing assembly which is pressed into an outer sleeve while entrapping an inner sleeve serving as an inner race. The inner race is pressed onto a shaft and has a turned up flange which serves as a thrust surface on both sides.

5 Claims, 1 Drawing Sheet

0423—TC—BE

ROLLER BEARING ASSEMBLY

This invention relates to roller bearing assemblies. More particularly, this invention is a novel unitary bearing assembly for receiving a shaft such as shafts used in piston pumps.

Briefly described, the roller bearing comprises an annular outer race with a radially inwardly extending portion. A sleeve has its inner surface firmly attached to the outer surface of the annular outer race and has a radially inwardly extending portion axially spaced from the radially inwardly extending portion of the annular outer race. An annular inner race extends through the outer race bore and has a thrust absorbing member extending radially outwardly and into the axial space between the annular outer race radially inwardly extending portion and the sleeve radially inwardly extending portion. A ring of rollers is located between the races. The sleeve and annular outer race are axially movable with respect to the annular inner race. Thus, movement of the sleeve and annular outer race in one axial direction causes the annular outer race radially inwardly extending portion to contact the annular inner race thrust absorbing member and movement of the sleeve and annular outer race in the other axial direction causes the sleeve radially inwardly extending portion to contact the annular inner race thrust absorbing member.

Figure 1:
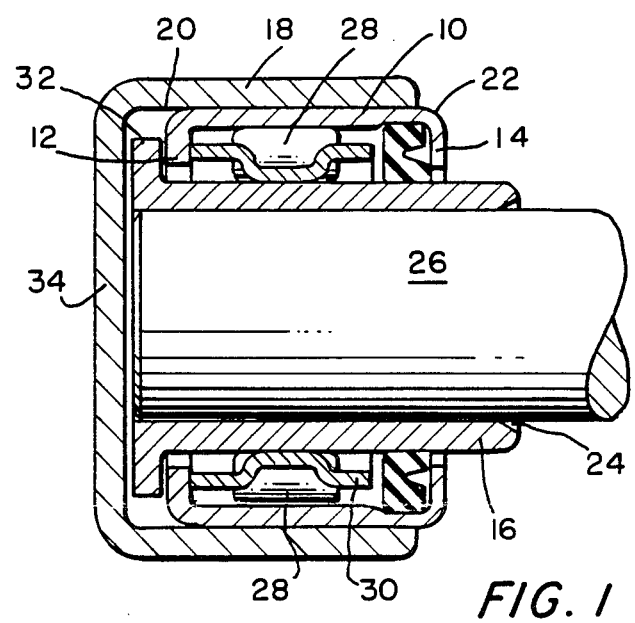
Figure 2:
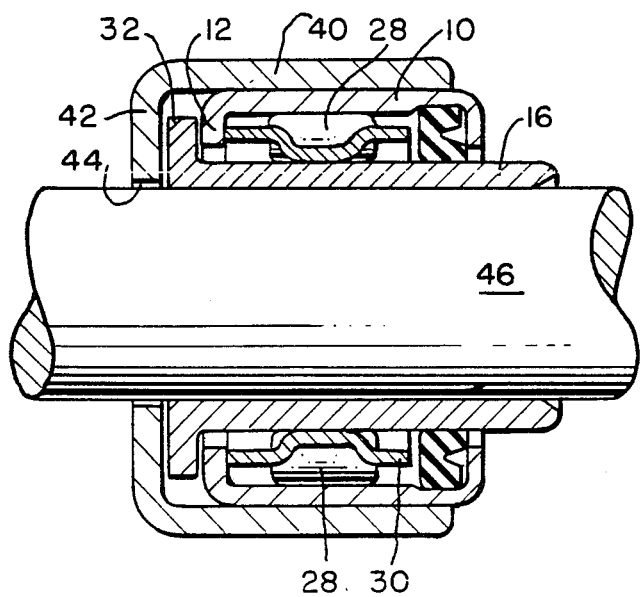

The invention, as well as its many advantages may be further understood by reference to the following detailed description and drawings in which:

FIG. 1 is a longitudinal sectional view through a typical form of roller bearing assembly embodying the present invention; and FIG. 2 is a longitudinal sectional view through a second embodiment of roller bearing assembly embodying the present invention.

In the various figures, like parts are referred to by like numbers. Referring to the drawings and more particularly to FIG. 1, the roller bearing comprises an annular outer race 10 having an outer surface of constant diameter throughout its length. The annular outer race 10 has end flanges 12 and 14. The annular end flanges 12 and 14 define a bore through which a sleeve 16 serving as an annular inner race extends.

An outer sleeve 18 has its inner surface 20 firmly attached to the outer surface 22 of the annular outer race 10.

The annular inner race 16 has a bore 24 which extends entirely through it and receives a shaft 26. The annular inner race 16 is pressed or staked on the shaft 26. A ring of rollers 28 is located between the annular races 10 and 16. In the embodiment shown in FIG. 1, a cage 30 circumferentially separates the rollers. However, if desired, the cage could be eliminated and a full complement of rollers used.

An important feature of this bearing assembly is that when it is pressed onto a shaft it will be axially located in either direction and the structure of the parts is such that a self-contained one-piece assembly is provided for mounting upon a shaft.

The axial location feature is obtained by the provision of the radially inwardly extending annular flange 12 on one end of the annular outer race 10, the radially outwardly extending annular flange 32 on one end of the sleeve 16 serving as an annular inner race, and the closed end 34 of the outer sleeve 18. The closed end 34 extends radially entirely across the end of sleeve 18.

The annular flange 12 on outer race 10 is axially spaced from the closed end 34 of the sleeve 18. The outwardly extending flange 32 on annular inner race 16 extends into the axial space between the flange 12 on outer race 10 and the closed end 34 of the sleeve 18.

As stated, the annular inner race 16 is firmly pressed on or staked to the shaft 26. The sleeve 18 and annular outer race 10 are axially movable with respect to the annular inner race 16. Therefore, movement of the sleeve and annular outer race in one axial direction causes the flange 12 to contact one side of the flange 32; movement of the sleeve and annular race in the opposite axial direction will cause the closed bottom 34 of the sleeve 18 to contact the other side of the flange 32. The flange 32 serves as a thrust surface on both sides.

To assemble a new roller bearing, the inner race 16 is placed within the outer sleeve 18. The annular outer race 10 with its cage and roller assembly is then pressed or interference fit into the outer sleeve 18 while at the same time entrapping the inner race 16. Thus, a selfcontained one-piece assembly is provided. The open end of outer sleeve 18 can optionally be curled over the end of outer race 10 to ensure no axial movement occurs between race 10 and sleeve 18.

In the embodiment of FIG. 2, the inner annular race 16, the outer annular race 22 and the cage and roller assembly have the same structure as the embodiment of FIG. 1. However, instead of having a closed bottom the annular sleeve 40 which is firmly attached to the outer surface of the annular outer race 22 has an annular flange 42 at one end thereof. The annular flange 42 locates the bearing on the shaft by being contacted by the annular flange 32 when the sleeve and outer race move to the left, looking at FIG. 2 and also defines an opening 44 for receiving the shaft 46. Thus, the shaft 46 will extend completely through the roller bearing assembly.

We claim:

1. A roller bearing comprising: an annular outer race having an outer surface of constant diameter throughout its length and an annular radially inwardly extending portion defining an outer race bore large enough to fit around an annular inner race; a sleeve having its inner surface firmly attached to the outer surface of the annular outer race and having a radially inwardly extending portion axially spaced from the radially inwardly extending portion of the annular outer race; and annular inner race extending through the outer race bore and having a trust absorbing member extending radially outwardly and into the axial spaced between the annular outer race radially inwardly extending portion and the sleeve radially inwardly extending portion; a ring of rollers located between said races, the sleeve and annular outer race being axially movable with respect to the annular inner race whereby movement of the sleeve and annular outer race in one axial direction causes the annular outer race radially inwardly extending portion to contact the annular inner race thrust absorbing member and movement of the sleeve and annular outer race in the other axial direction causes the sleeve radially inwardly extending portion to contact the annular inner race thrust absorbing member.

2. A roller bearing in accordance with claim 1 wherein: the annular inner race has a bore for receiving a shaft.

3. A roller bearing in accordance with claim 2 wherein: the annular outer race radially inwardly extending portion is an annular flange; and the annular inner race thrust absorbing member is an annular flange.

4. A roller bearing in accordance with claim 3 wherein: the sleeve radially inwardly extending portion is a closed end of the sleeve.

5. A roller bearing in accordance with claim 3 wherein: the sleeve radially inwardly extending portion is an annular flange, said flange also defining an opening for receiving a shaft.

* * * * *